United States Patent
Raju et al.

(10) Patent No.: US 10,708,329 B2
(45) Date of Patent: *Jul. 7, 2020

(54) APPLICATION STREAMING USING ACCESS AND EXECUTION ENVIRONMENTS

(71) Applicant: Amazon Technologies, Inc., Seattle, WA (US)

(72) Inventors: Gurinder Raju, Seattle, WA (US); Sheshadri Supreeth Koushik, Redmond, WA (US); Sunil Gaba, Seattle, WA (US); Deepak Suryanarayanan, Bellevue, WA (US); Abhinav Shrivastava, Seattle, WA (US); Karmveer Veer Singh, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,518

(22) Filed: Oct. 5, 2018

(65) Prior Publication Data
US 2019/0068669 A1 Feb. 28, 2019

Related U.S. Application Data

(63) Continuation of application No. 15/069,280, filed on Mar. 14, 2016, now Pat. No. 10,097,606.

(51) Int. Cl.
*H04L 29/08* (2006.01)
*H04L 29/06* (2006.01)
*G06F 9/50* (2006.01)

(52) U.S. Cl.
CPC ............ *H04L 65/60* (2013.01); *G06F 9/5044* (2013.01); *G06F 9/5072* (2013.01); *H04L 63/10* (2013.01); *H04L 67/42* (2013.01)

(58) Field of Classification Search
CPC ................. H04L 65/60; H04L 63/10
See application file for complete search history.

(56) References Cited

U.S. PATENT DOCUMENTS

| 8,489,898 | B2 | 7/2013 | Wong |
| 8,789,068 | B2 | 7/2014 | Russell |

(Continued)

OTHER PUBLICATIONS

International Search Report and Written Opinion from PCT/US2017/021750, Amazon Technologies, Inc., dated May 19, 2017, pp. 1-13.

*Primary Examiner* — Adnan M Mirza
(74) *Attorney, Agent, or Firm* — Robert C. Kowert; Kowert, Hood, Munyon, Rankin & Goetzel, P.C.

(57) ABSTRACT

Methods, systems, and computer-readable media for application streaming using access and execution environments are disclosed. User input comprising a selection of an application by a user is received. The user input is received at an access environment from a computing device associated with a client. The access environment permits access by the user, and the access environment is associated with an execution environment for the application. The execution environment specifies a computing resource description for the application. Execution of the application is initiated using one or more computing resources compatible with the computing resource description. A pixel display is streamed to the computing device associated with the client. The pixel display is associated with the application executing using the one or more computing resources.

20 Claims, 9 Drawing Sheets

(56) References Cited

U.S. PATENT DOCUMENTS

| | | |
|---|---|---|
| 8,856,796 B2 | 10/2014 | Moler |
| 8,973,093 B2 | 3/2015 | Park et al. |
| 9,009,294 B2 | 4/2015 | Dawson et al. |
| 9,106,537 B1 | 8/2015 | Emelyanov et al. |
| 9,170,857 B2 | 10/2015 | Kothari et al. |
| 9,171,149 B2 | 10/2015 | Erlingsson |
| 9,246,690 B1 | 1/2016 | Roth et al. |
| 9,276,990 B1 | 3/2016 | Urbach |
| 10,097,606 B2 | 10/2018 | Raju et al. |
| 2007/0036102 A1* | 2/2007 | Hwang .............. H04H 20/93 370/328 |
| 2013/0297676 A1 | 11/2013 | Binyamin |
| 2017/0212733 A1* | 7/2017 | Duggal ............... G06F 8/35 |

* cited by examiner

APPLICATION STREAMING USING ACCESS AND EXECUTION ENVIRONMENTS

This application is a continuation of U.S. patent application Ser. No. 15/069,280, filed Mar. 14, 2016, now U.S. Pat. No. 10,097,606, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers.

As the scale and scope of distributed systems have increased, the tasks of provisioning, administering, and managing the resources have become increasingly complicated. A distributed system referred to as a provider network may offer, to various customers, access to computing resources and services implemented using the distributed system. When customers access such resources remotely, the resources may be said to reside "in the cloud" and may represent cloud computing resources. For example, customers may operate cloud computing instances in order to execute customer-supplied programs on those instances, e.g., to produce non-graphical output.

Figure 1:
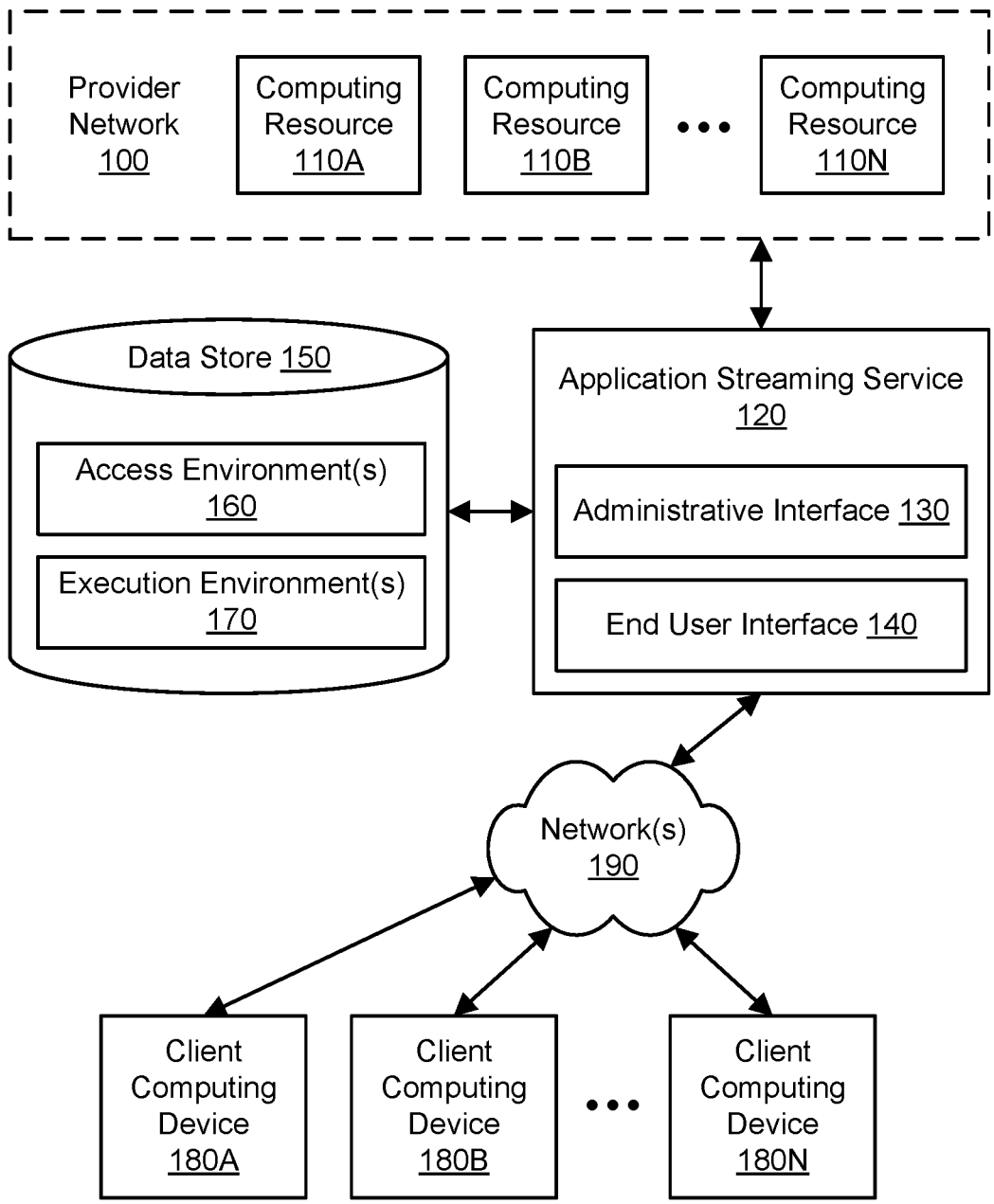
FIG. 1 illustrates an example system environment for application streaming using access and execution environments, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for application streaming using access and execution environments are described. Using the techniques described herein, pixel data produced by execution of an application in the cloud may be streamed to a client computing device by an application streaming service. A provider network may include computing resources, such as compute instances, on which the application is executed. The resulting pixel data may represent a user interface of the application, and the pixel data may be displayed on the client device (e.g., in a web browser or other suitable client software) while user input related to the application is potentially gathered on the client device and returned to the application executing in the provider network. The application streaming may be implemented using a combination of an access environment and an execution environment. An access environment may provide an access address (e.g., a Uniform Resource Locator [URL] that can be accessed via a web browser) and may permit access to a particular set of users (e.g., as specified by an administrator). The access environment may be linked to one or more execution environments. Each execution environment may specify a description of computing resources, such as compute instances, that are suitable for executing the one or more applications associated with the execution environment. Each execution environment may also specify an application source, such as a machine image or container, from which to obtain an application. Access and execution environments may be configured by an administrator in a one-to-one, one-to-many, many-to-one, or many-to-many relationship. For example, the same set of users may be provided a single access environment (with a single address reachable within a web browser) to stream a spreadsheet application on less powerful computing hardware or a graphics application on more powerful computing hardware. As another example, different sets of users may be provided different access environments (with different URLs) to stream the same application on the same category of hardware as specified by the same execution environment. In this manner, streaming access to applications executing "in the cloud" may be provided with flexibility and efficiency.

FIG. 1 illustrates an example system environment for application streaming using access and execution environments, according to one embodiment. An application streaming service 120 may provide, to client computing devices 180A-180N, access to graphical representations of applications that are executing using "cloud" computing resources 110A-110N of a provider network 100 instead of the client computing devices. The computing resources 110A-110N may include one or more physical compute instances, one or more virtual compute instances, one or more storage resources, one or more network resources, and/or other suitable types of computing resources. In one embodiment, the computing resource(s) used for executing a particular application for a particular user may be provisioned from a pool of computing resources offered by the provider network 100. The provider network 100 may offer access to resources and services, such as the application streaming service 120 and resources 110A-110N, using multi-tenancy, such that different resources are used by (or on behalf of) different clients at any given time.

The client computing devices 180A-180N may be associated with one or more clients of the provider network 100 and/or application streaming service 120. The client computing devices 180A-180N may be coupled to the provider network 100 via one or more networks 190. A client may represent a customer (e.g., an individual or group) of the provider network 100. Typically, a client associated with one or more of the client computing devices 180A-180N may be an organization that has entered into a fee-based arrangement for its employees or members to access the streaming service 120. For example, clients of the streaming service 120 may agree to pay for on-demand streaming of applications running in the provider network 100. As another example, clients of the streaming service 120 may agree to pay for "pre-hydration": one or more pre-configured and pre-launched instances that are expected to be ready at all times for access by the client.

The application streaming service 120 may include an administrative interface 130 and an end user interface 140. The administrative interface 130 and end user interface 140 may include any suitable programmatic interfaces such as application programming interfaces (APIs) and/or any suitable user interfaces such as graphical user interfaces (GUIs). Using the administrative interface 130, one or more administrators (e.g., users with administrative roles or privileges) may configure one or more access environments 160 and one or more execution environments 170. Each of the access environment(s) 160 may typically specify a set of authorized users and an indication of an access address (such as a URL) at which the access environment can be accessed. Each of the execution environment(s) 170 may typically specify a description of computing resources, such as compute instances, that are suitable for executing any applications associated with the execution environment. Each execution environment may also specify an application source, such as a machine image or container, from which to obtain the application. Execution environments may also be referred to as runtime environments. Access and execution environments may be configured by an administrator in a one-to-one, one-to-many, many-to-one, or many-to-many relationship. The access environment(s) 160 and execution environment(s) 170 may be represented using suitable data structures in a data store 150. The data store 150 may represent storage internal to the streaming service 120 or storage provided by one or more external storage services or systems, including database systems, block storage systems, and so on. Using the end user interface 140, one or more users operating the client devices 180A-180N may contact the streaming service 120, be authorized for access to particular access environments 160, select applications associated with particular execution environments 170, and be sent displays of pixels or other pixel data that result from the execution of the selected applications in the provider network 100.

The provider network 100 may be set up by an entity such as a company or a public sector organization to provide one or more services (such as various types of cloud-based computing or storage) accessible via the Internet and/or other networks to computing devices 160A-180N. Provider network 100 may include numerous data centers hosting various resource pools, such as collections of physical and/or virtualized computer servers, storage devices, networking equipment and the like (e.g., implemented using computing system 3000 described below with regard to FIG. 7), needed to implement and distribute the infrastructure and services offered by the provider network. In some embodiments, provider network 100 may provide computing resources, such as application streaming service 120 and resources 110A-110N; storage services, such as a block-based storage service, key-value based data stores, or various types of database systems; and/or any other type of network-based services. Computing devices 180A-180N may access these various services offered by provider network 100 via network(s) 190. Likewise, network-based services may themselves communicate and/or make use of one another to provide different services. For example, computing resources offered in units called "instances," such as virtual or physical compute instances or storage instances, may make use of particular data volumes, providing virtual block storage for the compute instances. The provider network 100 may implement or provide a multi-tenant environment such that multiple clients (e.g., using computing devices 180A-180N) may access or use a particular resource in a substantially simultaneous manner. For example, the application streaming service 120 may be offered to multiple clients (in a substantially simultaneous manner) in such a multi-tenant provider network 100, such that the same computational and storage resources associated with the streaming service may be used on behalf of different clients over the same window of time. The different clients may represent different individuals and/or different organizations that may pay the provider network 100 for access to one or more services and/or resources.

The provider network 100 may include a fleet of computing devices, also referred to herein as servers, hosts, or instances, which are configured to execute software on behalf of clients of the provider network. In one embodiment, a fleet of servers may grow or shrink as individual servers are provisioned or deprovisioned using resources of the provider network 100. In one embodiment, the fleet of servers may grow or shrink as individual servers are added to or removed from a dedicated fleet by an administrator. The computing resources 110A-110N that represent the fleet may be heterogeneous in terms of their computing hardware and/or software configurations.

The computing devices 180A-180N may represent or correspond to various clients or users of the provider network 100, such as customers who seek to use services offered by the provider network. The clients, users, or customers may represent persons, businesses, other organizations, and/or other entities. The computing devices 180A-180N may encompass any type of client configurable to submit requests to provider network 100. For example, a given computing device may include a suitable version of a web browser, or it may include a plug-in module or other type of code module configured to execute as an extension to or within an execution environment provided by a web browser. In some embodiments, such a client application may include sufficient protocol support (e.g., for a suitable version of Hypertext Transfer Protocol [HTTP]) for generating and processing network-based service requests without necessarily implementing full browser support for all types of network-based data. In some embodiments, computing devices 180A-180N may be configured to generate network-based service requests according to a Representational State Transfer (REST)-style network-based services architecture, a document- or message-based network-based services architecture, or another suitable network-based services architecture. In at least some embodiments, computing devices 180A-180N may provision, mount, and configure storage volumes implemented at storage services for file systems implemented at the computing devices.

Computing devices 180A-180N may convey network-based service requests to provider network 100 via external network(s) 190. In various embodiments, external network(s) 190 may encompass any suitable combination of networking hardware and protocols necessary to establish network-based communications between computing devices 180A-180N and provider network 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given computing device and the provider network 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given computing device and the Internet as well as between the Internet and the provider network 100. It is noted that in some embodiments, computing devices 180A-180N may communicate with provider network 100 using a private network rather than the public Internet.

The provider network 100 and streaming service 120 may include a plurality of computing devices, any of which may be implemented by the example computing device 3000 illustrated in FIG. 8. Similarly, any of the computing resources 110A-110N and/or computing devices 180A-180N may be implemented using the example computing device 3000 illustrated in FIG. 8. In various embodiments, portions of the described functionality of the provider network 100 and application streaming service 120 may be provided by the same computing device or by any suitable number of different computing devices. If any of the components of the provider network 100 and application streaming service 120 are implemented using different computing devices, then the components and their respective computing devices may be communicatively coupled, e.g., via a network. Each of the illustrated components (such as the application streaming service 120 and its constituent functionalities) may represent any combination of software and hardware usable to perform their respective functions.

It is contemplated that the provider network 100 may include additional components not shown, fewer components than shown, or different combinations, configurations, or quantities of the components shown. For example, although computing resources 110A and 110B through 110N are shown for purposes of example and illustration, it is contemplated that different quantities and configurations of computing resources may be used. Additionally, although client computing devices 180A and 180B through 180N are shown for purposes of example and illustration, it is contemplated that different quantities and configurations of client computing devices may be used. Aspects of the functionality described herein may be performed, at least in part, by components outside of the provider network 100.

Figure 2A:
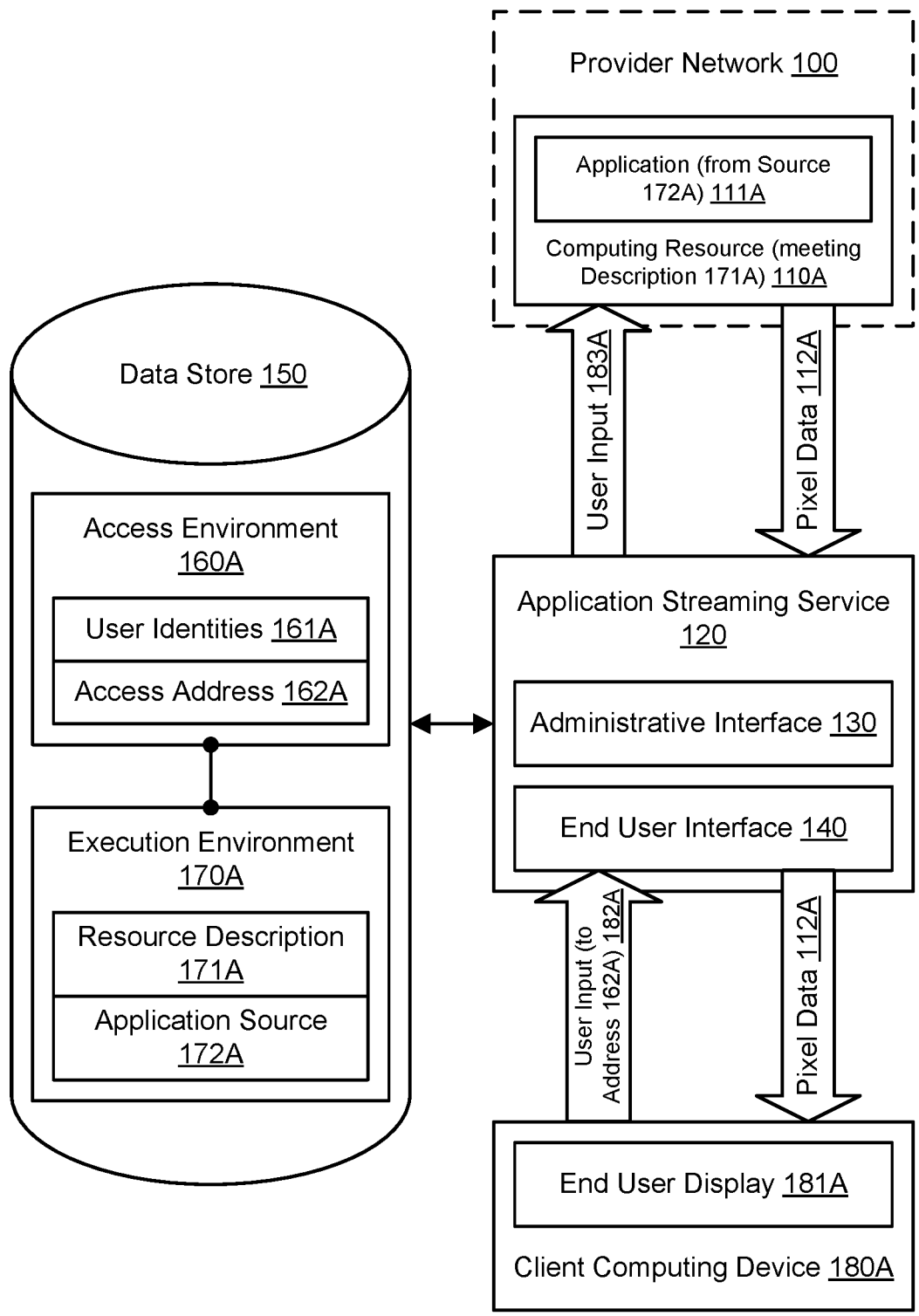
FIG. 2A illustrates further aspects of the example system environment for application streaming using access and execution environments, including application streaming using one access environment linked to one execution environment, according to one embodiment.

FIG. 2A illustrates further aspects of the example system environment for application streaming using access and execution environments, including application streaming using one access environment linked to one execution environment, according to one embodiment. The data store 150 may store data indicative of a particular access environment 160A and a particular execution environment 170A. The access environment 160A and execution environment 170A may be defined and/or configured by an administrator using the administrative interface 130 of the application streaming service 120. The access environment 160A may specify a set of one or more user identities 161A that are authorized for access and an access address 162A (such as a URL) at which the access environment can be accessed. The set of user identities 161A may be configured and specified by an administrator as a list of one or more specified users, as a list of specified groups or organizations to which one or more users belong, and/or as a list of specified attributes (e.g., roles) that characterize one or more user accounts or user groups. The user identities 161A may include a particular user who is operating a client computing device 180A.

The user may operate the client device 180A in order to connect to the application streaming service 120 via the access address 162A. For example, the user may attempt to load the access address 162A in a web browser or other suitable client software running on the computing device 180A operated by the user; the browser or client software may then send an appropriate message (e.g., to the end user interface 140) to seek access. The user input 182A to the access address 162A may include such an attempt to access the access address 162A. When the user attempts to access the access address 162A (e.g., through the end user interface 140), the application streaming service 120 may attempt to validate the user's access to the access environment 160A associated with the access address 162A. One or more external services or systems may be used to validate user access. For example, a directory service such as Microsoft® Active Directory may authenticate and authorize access by a particular user. In one embodiment, the user's identity may be authenticated by the directory service prior to accessing the application streaming service 120, and the streaming service may interact with the directory service to authorize that user's access to the access environment 160A when contact with the streaming service is initiated. The directory service may also determine one or more roles (e.g., administrator or normal user) or groups (e.g., divisions within an organization) associated with a user account, and a role or group may be relevant to access validation. If validation fails, then access to the application streaming service 120 and/or the access environment 160A may be denied to the user at this particular time.

The data store 150 may also store data or metadata representing a link or association between the access environment 160A and the execution environment 170A. Again, the link or association may be determined or configured by an administrator using the administrative interface 130 of the application streaming service 120. The execution environment 170A may specify a resource description 171A and an application source 172A. The resource description 171A may represent a description of computing resources, such as compute instances, that are suitable for executing any applications associated with the execution environment. The application source 172A may represent a machine image or container from which to obtain the application. The execution environment 170A may also indicate one or more applications that are supported by (e.g., executable within) the execution environment 170A.

After the user access with the client device 180A has been authorized with respect to the access environment 160A, a list of available applications may be provided to the user by the streaming service 120. One or more execution environments may be linked to the access environment, and each of the execution environments may be associated with one or more applications. The list of available applications may be determined based (at least in part) on the applications provided by the set of one or more execution environments associated with the access environment, including the one or more applications associated with the execution environment 170A. The list of available applications may be sent to the client computing device 180A for display, e.g., in the browser or other client software. The list may be rendered by the application streaming service 120 and sent to the client device 180A as displayable pixel data (e.g., in the browser or client software) or may instead be rendered on the client device based (at least in part) on non-graphical data sent by the streaming service. The browser or other client software may permit the user to enter appropriate user input 182A to select one of the available applications from the list. In one embodiment, the application streaming service (through the end user interface 140) may receive such user input 182A that represents an indication or selection of application 111A from the list of available applications.

The execution environment 170A may specify a description 171A of computing resources, such as compute instances, that are suitable for executing the application 111A. The computing resource description 171A may indicate a recommended type of compute instance, e.g., where the provider network 100 provides multiple types of compute instances that vary in performance and/or cost. The computing resource description 171A may indicate a recommended configuration of a compute instance or other configuration of memory resources, storage resources, network resources, graphics processing resources, power resources, and other suitable types of computing resources. For example, the computing resource description 171A may indicate that a compute instance should be domain-joined to a particular domain and have access to a particular type and size of storage. The computing resource description 171A may specify a range of acceptable resources, such as a range bounded by a minimum instance type and/or configuration and a maximum instance type and/or configuration. Based (at least in part) on the computing resource description 171A for the execution environment 170A, one or more computing resources such as resource 110A may be selected and/or configured for execution of the application. The resource 110A may be said to be selected for its compatibility with the computing resource description 171A, e.g., such that the resource meets or matches the computing resource description. The computing resource 110A may typically represent a physical compute instances or virtual compute instance but may also include one or more storage resources, one or more network resources, and/or other suitable types of computing resources. In one embodiment, the computing resource 110A may be provisioned from a pool of computing resources offered by a provider network 100.

The provider network 100 may represent a multi-tenant environment in which different resources are used by (or on behalf of) different clients at any given time. When a set of application streaming instances is offered to multiple clients at any given time, applications may typically be used with containerization for ease of security management. When a set of application streaming instances is offered to a single client at any given time, applications may be used with containerization or sourced from machine images. In one embodiment, clients of the streaming service 120 may agree to pay for "pre-hydration": a defined number of one or more pre-configured and pre-launched instances (e.g., booted from machine images) that are expected to be ready at all times for access by the client. In one embodiment, the resource 110A may be reserved and kept running for the client prior to a user request to launch an application such that resource need not be newly provisioned and launched when a user associated with that client seeks access to application streaming. Instances may also be provisioned and launched in accordance with schedules, e.g., such that properly configured instances are ready before users are expected to begin sessions on a weekday. Storage resources associated with streaming applications (e.g., to store their output) may not be persistent within the provider network 100.

The execution environment 170A associated with the application 111A may specify an application source 172A for the application. The selected application 111A may be obtained from the application source and installed and launched on the computing resource 110A. In one embodiment, the application source 172A may represent a machine image that includes an executable instance of the application potentially along with other software such as system software. The machine image may be acquired from a suitable source (e.g., within the provider network 100), and a compute instance 110A suitable for executing the application may be loaded (e.g., booted) with the machine image. Accordingly, the application 111A may be present on the instance 110A at launch if the application source 172A is a machine image. In one embodiment, the application source 172A may represent a container, and the contents of the container (including an executable instance of the application) may be acquired from a suitable source (e.g., within the provider network) after a suitable compute instance 110A has been launched. The use of a container may permit more flexible version management for the application since the contents of the container may be changed easily and frequently without the need to repeatedly modify a configuration of the execution environment 170A itself (e.g., to generate and specify an up-to-date machine image). One or more suitable containerization services or systems, such as Amazon® EC2 Container Service, may be used to support containers for executing applications with the application streaming service.

Execution of the application 111A may be initiated using the computing resource 110A. The execution may produce a pixel display or other set of pixel data 112A that may be refreshed at appropriate intervals. The pixel data 112A may represent a user interface of the application 111A, e.g., including one or more windows or other graphical user interface (GUI) elements as would typically be generated by execution of the application on a particular operating system. In this manner, a graphical representation of execution of the application 111A may be rendered in the provider network 100. The pixel data 112A may be streamed to the client computing device 180A. The pixel data 112A may be displayed in an end user display 181A, e.g., in a browser or other client software of the client computing device 180A. User input 183A to the application (e.g., by mouse, trackpad, keyboard, touch input, and so on) may be gathered in the browser or client software and transmitted to the application executing in the provider network 100. In this manner, responsibility for executing the application 111A and rendering its user interface may be delegated from the client computing device 180A to computing resources in the provider network 100, as specified in an execution environment 170A associated with an access environment 160A, and the client device may merely display the results as streamed over a network connection.

Figure 2B:
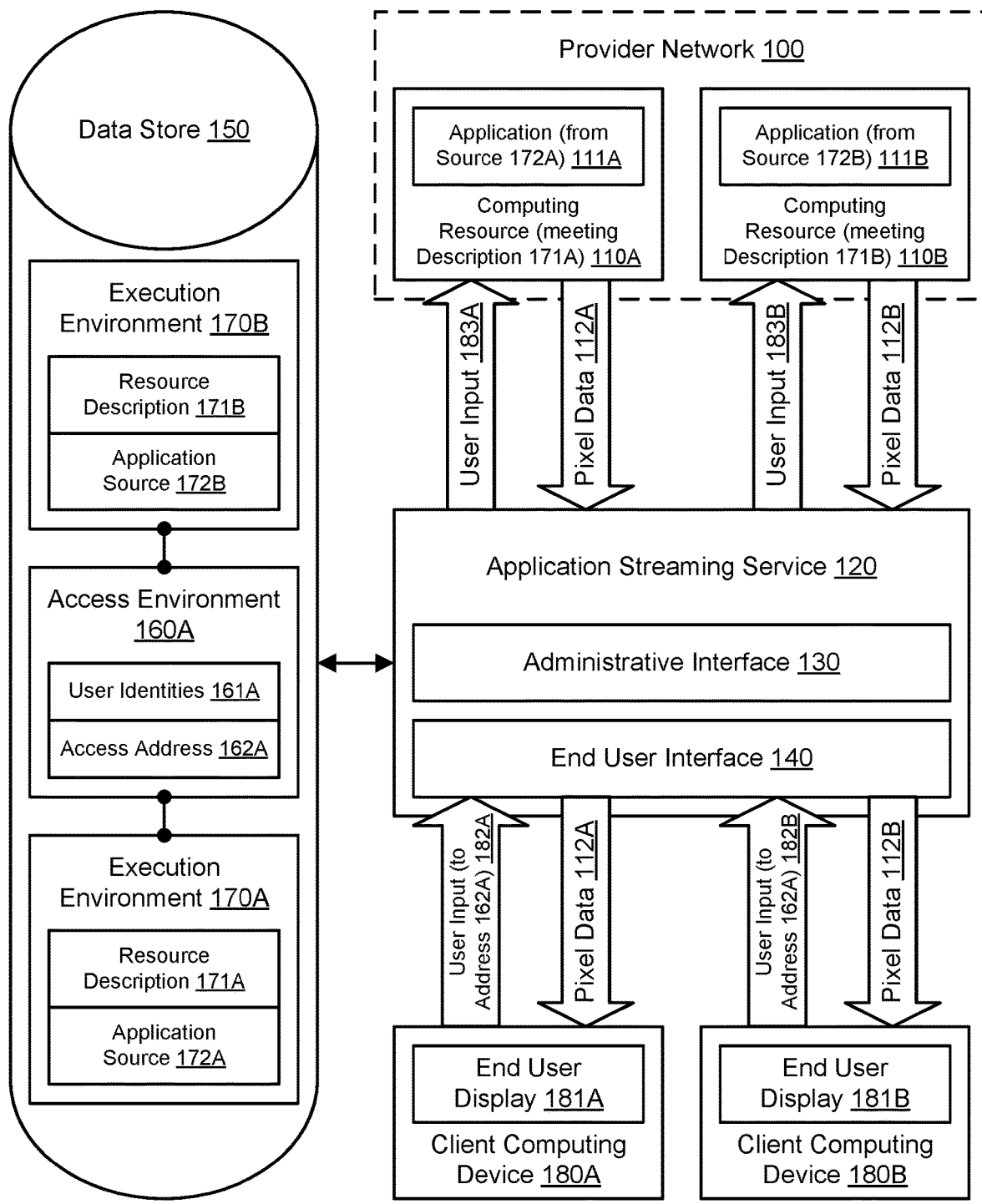
FIG. 2B illustrates further aspects of the example system environment for application streaming using access and execution environments, including application streaming using one access environment linked to multiple execution environments, according to one embodiment.

FIG. 2B illustrates further aspects of the example system environment for application streaming using access and execution environments, including application streaming using one access environment linked to multiple execution environments, according to one embodiment. Access and execution environments may be configured by an administrator in a one-to-one, one-to-many, many-to-one, or many-to-many relationship. As shown in the example of FIG. 2B, the same set of users 161A may be provided a single access environment 160A (with a single address 162A, e.g., as reachable within a web browser) to two different execution environments 170A and 170B. For example, the first access environment 170A may permit the users 161A to stream a spreadsheet application on less powerful computing hardware (consistent with the resource description 171A), while the second access environment 170B may permit the same users 161A to stream a graphically intensive application on more powerful computing hardware (consistent with the resource description 171B). As another example, the same application may be streamable with two different execution environments 170A and 170B, but the resource descriptions 171A and 171B may vary to provide execution with different performance or cost characteristics. As yet another example, the same application may be streamable with two different execution environments 170A and 170B, but the application sources 172A and 172B may differ. For example, the application source 172A may represent a machine image that includes a particular application, while the application source 172B may represent a container for the same application. In this manner, streaming access to applications executing "in the cloud" may be provided with flexibility and efficiency.

As shown in the example of FIG. 2B, both the client computing devices 180A and 180B may be authorized for access to the access environment 160A (e.g., through the access address 162A) when operated by users with authorized identities 161A. The same list of available applications (including applications 111A and 111B) may be presented to the users of both client devices 180A and 180B, e.g., as determined based on the applications supported by the execution environments 170A and 170B. The client device 180A may submit user input 182A that represents a selection of application 111A supported by the execution environment 170A. The client device 180B may submit user input 182B that represents a selection of application 111B supported by the execution environment 170B. At least one computing resource 110A that meets the resource description 171A may be provisioned or otherwise provided for streaming the application 111A to the client device 180A, and the application 111A may be installed from the application source 172A. Similarly, at least one computing resource 110B that meets the resource description 171B may be provisioned or otherwise provided for streaming the application 111B to the client device 180B, and the application 111B may be installed from the application source 172B. The computing resources 110A and 110B may be provisioned or provided by the same provider network 100. Execution of the application 111A, potentially with additional user input 183A, may generate pixel data 112A that is streamed to the client device 180A and displayed in an end user display 181A. Execution of the application 111B, potentially with additional user input 183B, may generate pixel data 112B that is streamed to the client device 180B and displayed in an end user display 181B.

Figure 2C:
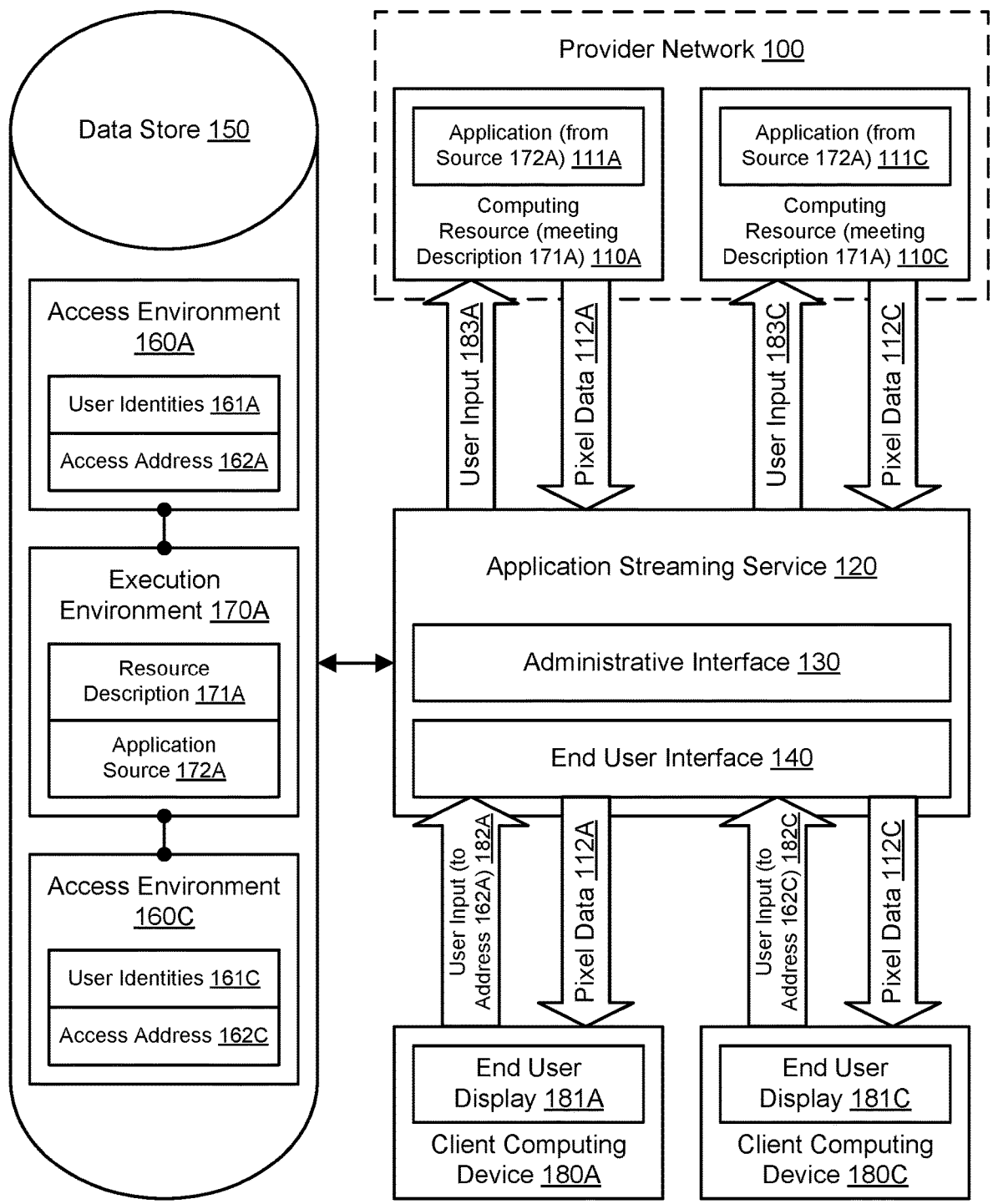
FIG. 2C illustrates further aspects of the example system environment for application streaming using access and execution environments, including application streaming using multiple access environments linked to one execution environment, according to one embodiment.

FIG. 2C illustrates further aspects of the example system environment for application streaming using access and execution environments, including application streaming using multiple access environments linked to one execution environment, according to one embodiment. As discussed above, access and execution environments may be configured by an administrator in a one-to-one, one-to-many, many-to-one, or many-to-many relationship. As shown in the example of FIG. 2C, the same execution environment 170A may be accessible through two different access environments 160A and 160C. The access addresses (e.g., URLs) 162A and 162C may differ for the two access environments 160A and 160C. In one embodiment, the set of user identities 161A may differ (at least in part) from the set of user identities 161C. For example, different sets of users from different departments within a client organization may be provided different URLs to stream the same application on the same category of hardware (as represented by the resource description 171A). In a further example, the access environment 160C may also be linked to one or more additional execution environments so that the list of available applications may differ for the access environment 160C. In this manner, streaming access to applications executing "in the cloud" may be provided with flexibility and efficiency.

As shown in the example of FIG. 2C, the client computing devices 180A may be authorized for access to the access environment 160A (e.g., through the access address 162A) when operated by users with authorized identities 161A. The client computing devices 180C may be authorized for access to the access environment 160C (e.g., through the access address 162C) when operated by users with authorized identities 161C. The client device 180A may submit user input 182A that represents a selection of application 111A supported by the execution environment 170A. The client device 180B may submit user input 182C that represents a selection of application 111C supported by the execution environment 170A (or by any other execution environment linked to the access environment 160C). The applications 111A and 111C may represent different applications (including different versions) or different instances of the same application. At least one computing resource 110A that meets the resource description 171A may be provisioned or otherwise provided for streaming the application 111A to the client device 180A, and the application 111A may be installed from the application source 172A. Similarly, at least one computing resource 110C that meets the resource description 171A may be provisioned or otherwise provided for streaming the application 111C to the client device 180C, and the application 111C may be installed from the application source 172A. The computing resources 110A and 110C may be provisioned or provided by the same provider network 100. Execution of the application 111A, potentially with additional user input 183A, may generate pixel data 112A that is streamed to the client device 180A and displayed in an end user display 181A. Execution of the application 111C, potentially with additional user input 183C, may generate pixel data 112C that is streamed to the client device 180C and displayed in an end user display 181C.

Figure 3:
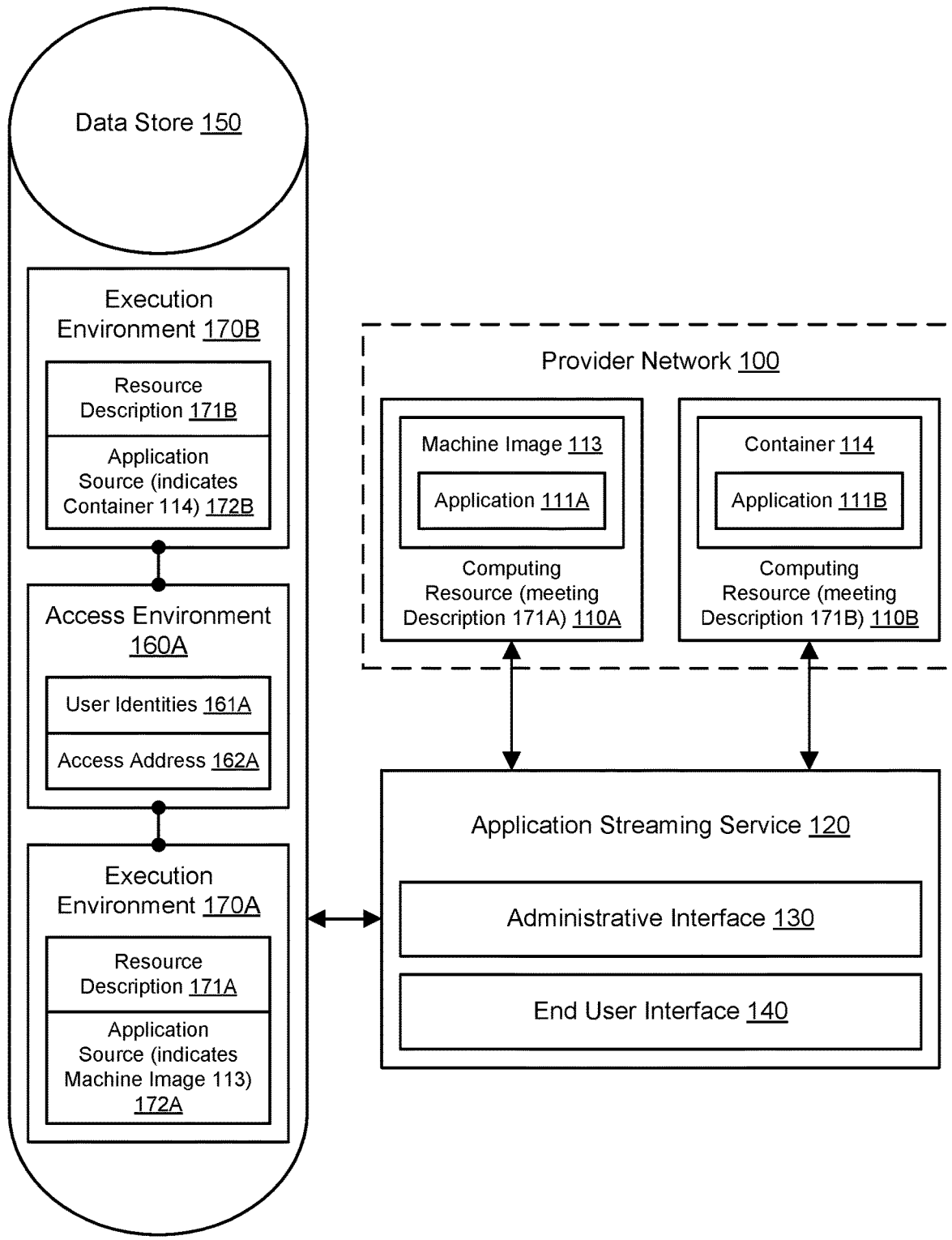
FIG. 3 illustrates further aspects of the example system environment for application streaming using access and execution environments, including the use of both a machine image and a container as application sources, according to one embodiment.

FIG. 3 illustrates further aspects of the example system environment for application streaming using access and execution environments, including the use of both a machine image and a container as application sources, according to one embodiment. As discussed above, both machine images and containers may serve as sources for streamed applications. The execution environment 170A associated with the application 111A may specify an application source 172A for the application. The selected application 111A may be obtained from the application source and installed and launched on the computing resource 110A. As shown in the example of FIG. 3, the application source 172A may represent a machine image 113. The machine image 113 may include an executable instance of the application 111A potentially along with other software such as system software. The machine image 113 may be acquired from a suitable source (e.g., within the provider network 100), and a compute instance 110A suitable for executing the application may be loaded (e.g., booted) with the machine image. Accordingly, the application 111A may be present on the instance 110A at launch if the application source 172A is a machine image 113.

As also shown in the example of FIG. 3, the application source 172B may represent a container 114. The contents of the container 114 (including an executable instance of the application 111B) may be acquired from a suitable source (e.g., within the provider network) after a suitable compute instance 110B has been launched. The use of a container 1114 may permit more flexible version management for the application 111B since the contents of the container may be changed easily and frequently without the need to repeatedly modify a configuration of the execution environment 170B itself (e.g., to generate and specify an up-to-date machine image). One or more suitable containerization services or systems, such as Amazon® EC2 Container Service, may be used to support containers for executing applications with the application streaming service.

Figure 4:
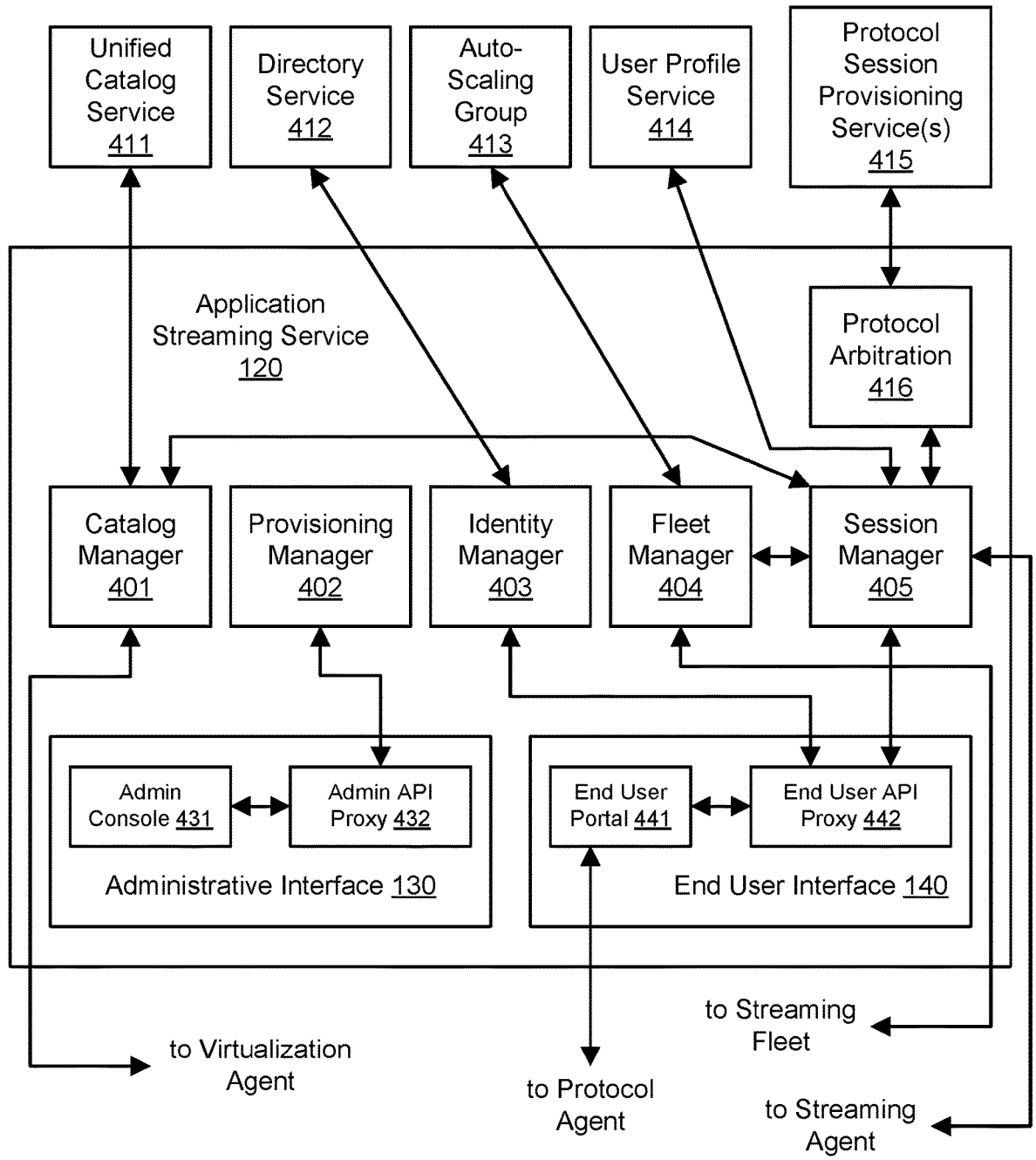
FIG. 4 illustrates further aspects of the example system environment for application streaming using access and execution environments, including additional components of an application streaming service, according to one embodiment.

FIG. 4 illustrates further aspects of the example system environment for application streaming using access and execution environments, including additional components of an application streaming service, according to one embodiment. The components illustrated within the application streaming service 120 in FIG. 4 may represent a control plane for the application streaming described herein. The administrative interface 130 may include an admin console 431 and an admin API proxy 432. The admin console 431 may represent a user interface for administrators to perform tasks such as creating, configuring, and defining access environments and execution environments as well as defining the relationships between them. The admin API proxy 432 may act as a sentry for all interactions between the streaming service 120 and the administrator(s), e.g., to handle API calls generated by the console 431 and provide output to the console. The end user interface 140 may include an end user portal 441 and an end user API proxy 442. The end user portal 441 may render at least part of the end user display, including the pixel data generated by execution of an application in the provider network, and may potentially process or transform the pixel data before display by the client device. In one embodiment, the end user portal 441 may include a client component on the client computing device, e.g., a component within a web browser or a standalone client application. The end user API proxy 442 may act as a sentry for all interactions between the streaming service 120 and the end user(s), e.g., to handle API calls generated by the end user portal 441 and provide output to the portal. The admin API proxy 432 and end user API proxy 442 may be built on a development kit or other framework for the application streaming as described herein.

The application streaming service 120 may include additional services or components such as a catalog manager 401, a provisioning manager 402, an identity manager 403, a fleet manager 404, and a session manager 405. The provisioning manager 402 may be used by the admin API proxy 432 for creating, configuring, and defining access environments and execution environments as well as defining the relationships between them. The end user API proxy 442 may work with the identity manager 403 to verify the identities of users seeking access and validate or authorize those users for access to particular access environments. When the user seeks to launch an application, the end user API proxy 442 may call the session manager 405 to create a session. The catalog manager 401 may serve as a repository for applications and their metadata, including information regarding machine images and containers for applications. The session manager 405 may interact with the catalog manager 401 to obtain a list of available applications for a session. The session manager 405 may then interact with the fleet manager 404 to create an instance in the provider network from which to stream the selected application. The fleet manager 404 may interact with the application streaming fleet or other resources in the provider network 100 to reserve and/or manage an instance, and it may then return an identifier or other details of that instance to the session manager 405. A one-to-one connection between the application streaming instance and the end user portal 441 may then be created for display of pixel data generated by the instance in the execution of the application. The connection may use any suitable protocol, such as TCP or UDP, as provided by the one or more protocol session provisioning services 415. The session manager 405 may use protocol arbitration 416 to interact with any of the protocol-specific session provisioning services 415.

Additionally, the application streaming service 120 may interact with external services or components, e.g., within the provider network 100. The catalog manager 401 may interact with a unified catalog service 411 to obtain data and metadata regarding available applications. The identity manager 403 may interact with a directory service 412 to authorize a user. The session manager 405 may interact with a user profile service 414 for user authorization. The fleet manager 403 may interact with an auto-scaling group 413 within the provider network 100 to bring up new instances and implement an execution environment within the provider network. The auto-scaling group 413 may represent an internal database service used for management of compute instances, e.g., to provision new instances from a pool of available resources. As shown in FIG. 1, the application streaming service 120 may have access to a data store 150. In addition to definitions of the access environments and execution environments, the data store 150 may include data relating to application collections, application sessions, application assignments, user sessions, usage policies, and/or identity providers.

Figure 5:
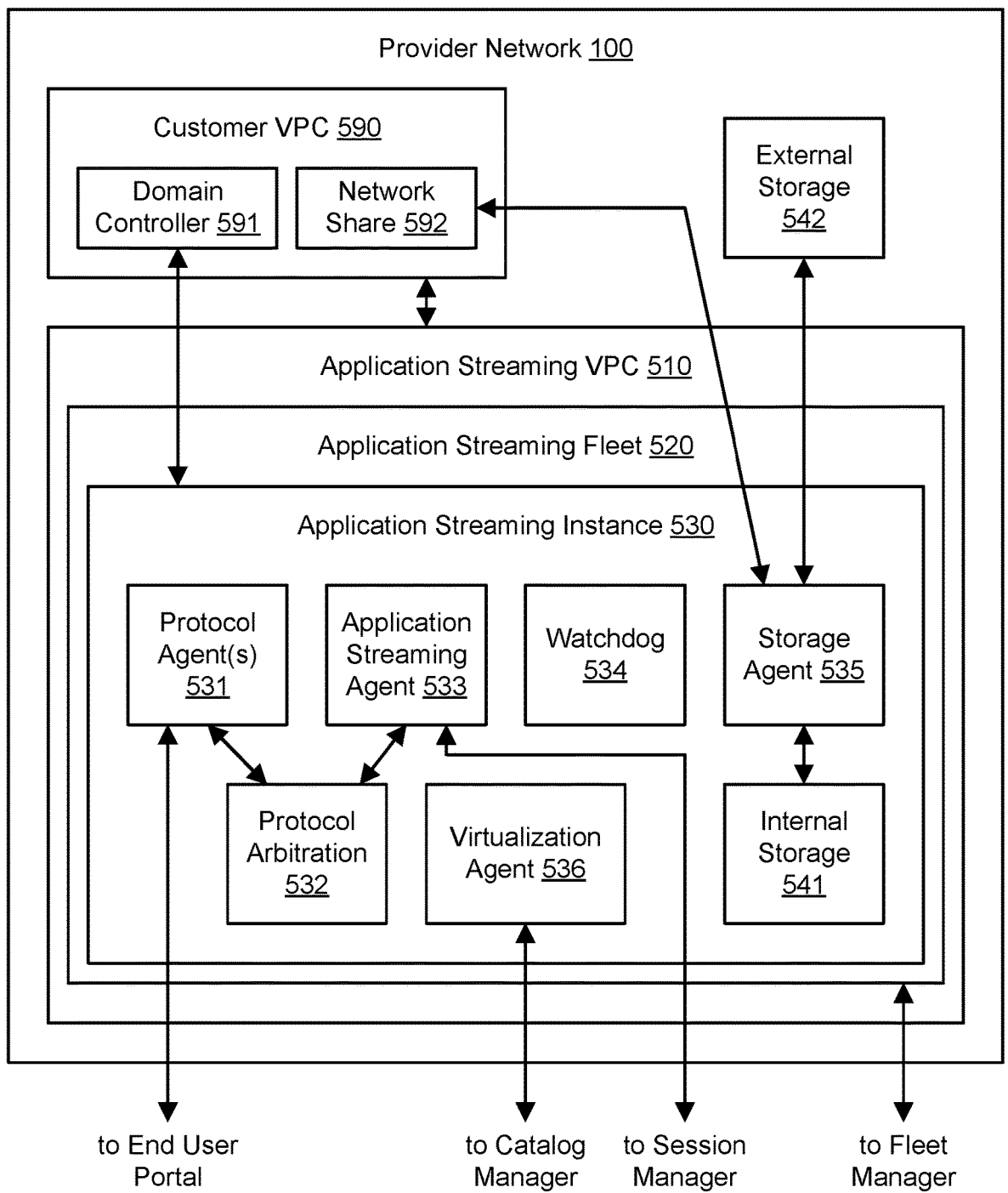
FIG. 5 illustrates further aspects of the example system environment for application streaming using access and execution environments, including additional components of an application streaming instance, according to one embodiment.

FIG. 5 illustrates further aspects of the example system environment for application streaming using access and execution environments, including additional components of an application streaming instance, according to one embodiment. The provider network 100 may include a virtual private cloud (VPC) 510 dedicated to application streaming using the techniques described herein. The application streaming VPC 510 may include an application streaming fleet 520 of a plurality of compute instances, e.g., virtual compute instances implemented with computing resources of the provider network 100. The fleet 520 may include a particular instance 530 used for application streaming for a particular user session. The instance 530 may include components such as one or more protocol agents 531, an application streaming agent 533, a watchdog 534, a storage agent 535, and a virtualization agent 536. The protocol agent(s) may be protocol-specific for protocols such as TCP or UDP to enable a direct connection to the end user portal for streaming of pixel data. The application streaming agent 533 may use protocol arbitration 532 to use the one or more protocols. The application streaming agent 533 may also interact with the session manager of the streaming service, e.g., to dynamically fetch containers for containerized applications. The virtualization agent 536 may interact with the catalog manager to install applications on the instance 530, e.g., by fetching the bits of applications associated with containers and dynamically filling containers with fetched applications. The storage agent 535 may make storage resources available to the instance 5230, such as one or more external storage services or systems 542, any internal storage resources 541, and/or network shared storage 592. The provider network 100 may optionally include a VPC for a customer of the streaming service. The customer VPC 590 may include a domain controller 591 for domain joining to the streaming instance 530 and a network share 592 for providing customer storage to the storage agent 535 on the streaming instance.

Figure 6:
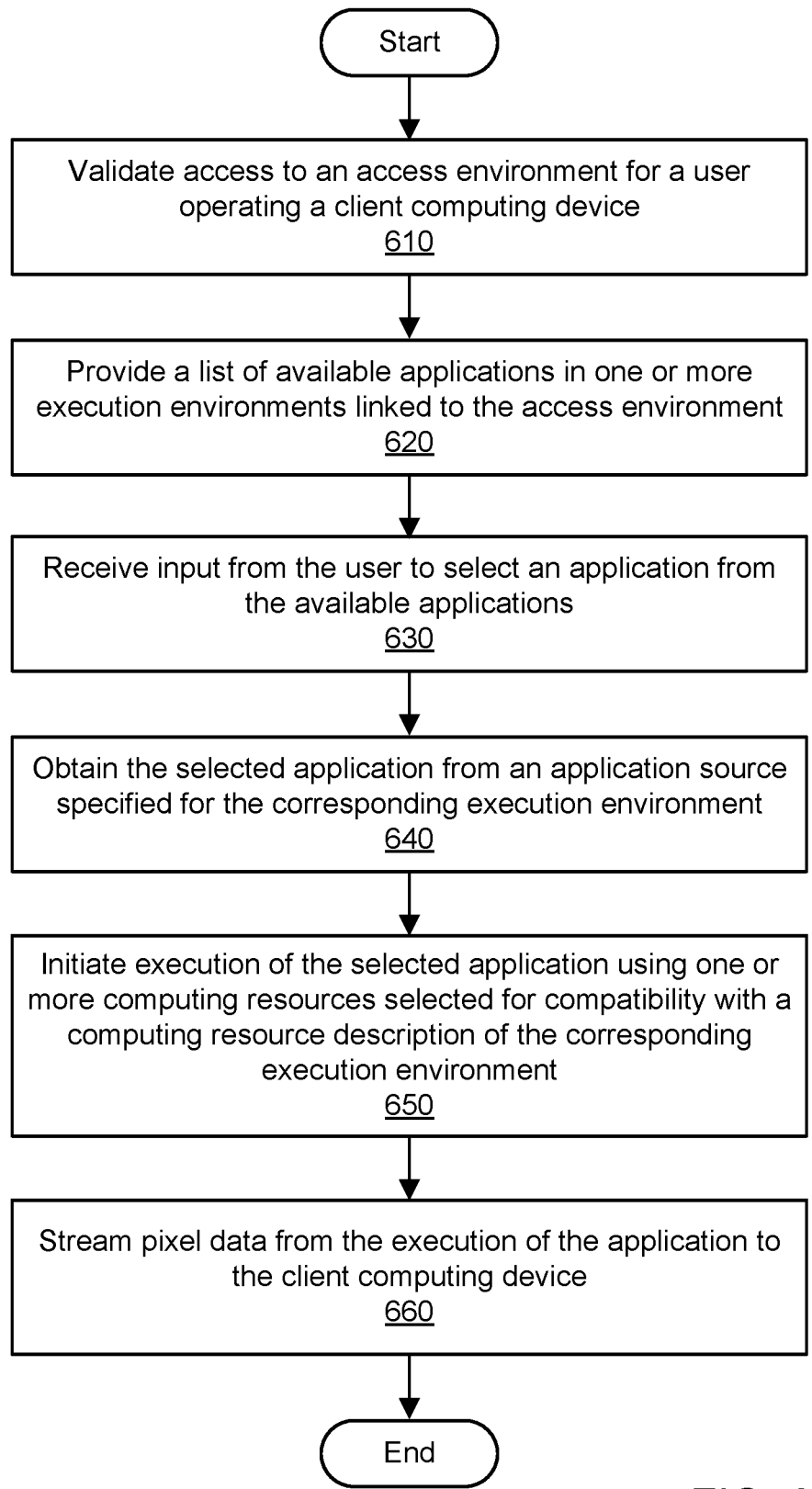
FIG. 6 is a flowchart illustrating a method for application streaming using access and execution environments, according to one embodiment.

FIG. 6 is a flowchart illustrating a method for application streaming using access and execution environments, according to one embodiment. As shown in 610, attempted access by a user to an access environment may be validated. The access environment may represent a mode for interacting with an application streaming service, and the user may be affiliated with a client of the application streaming service. The client is typically an organization that has entered into a fee-based arrangement for its employees or members to access the streaming service. The access environment may be accessible via an access address such as a URL, and the validation may be performed when the user attempts to load the access address in a web browser or other suitable client software running on a computing device operated by the user. The access environment may permit access to a set of one or more users. The set of permitted users for the access environment may be configured and specified by an administrator as a list of one or more specified users, as a list of specified groups or organizations to which one or more users belong, and/or as a list of specified attributes (e.g., roles) that characterize one or more user accounts or user groups. One or more external services or systems may be used to validate user access. For example, a directory service such as Microsoft® Active Directory may authenticate and authorize access by a particular user. In one embodiment, the user's identity may be authenticated by the directory service prior to accessing the application streaming service, and the streaming service may interact with the directory service to authorize that user's access to the access environment when contact with the streaming service is initiated. The directory service may also determine one or more roles (e.g., administrator or normal user) or groups (e.g., divisions within an organization) associated with a user account, and a role or group may be relevant to access validation. If validation fails, then access to the application streaming service may be denied to the user at this particular time. If validation is successful, then the method may proceed as follows.

As shown in 620, a list of available applications may be provided to the user. One or more execution environments may be linked to the access environment, and each of the execution environments may be associated with one or more applications. The list of available applications may be determined based (at least in part) on the applications provided by the set of one or more execution environments associated with the access environment. The list of available applications may be sent to the client computing device for display, e.g., in the browser or other client software. The list may be rendered by the application streaming service and sent to the client device as displayable pixel data (e.g., in the browser or client software) or may instead be rendered on the client device based (at least in part) on non-graphical data sent by the streaming service. The browser or other client software may permit the user to enter appropriate user input to select one of the available applications from the list. As shown in 630, input from the user may be received that represents an indication or selection of one of the available applications.

The execution environment associated with the application may specify an application source for the application. As shown in 640, the selected application may be obtained from the application source. In one embodiment, the application source may represent a machine image that includes an executable instance of the application potentially along with other software such as system software. The machine image may be acquired from a suitable source (e.g., within the provider network), and a compute instance suitable for executing the application may be loaded (e.g., booted) with the machine image. Accordingly, the application may be present on the instance at launch if the application source is a machine image. In one embodiment, the application source may represent a container, and the contents of the container (including an executable instance of the application) may be acquired from a suitable source (e.g., within the provider network) after a suitable compute instance has been launched. The use of a container may permit more flexible version management for the application since the contents of the container may be changed easily and frequently without the need to repeatedly modify a configuration of the execution environment itself (e.g., to generate and specify an up-to-date machine image). One or more suitable containerization services or systems, such as Amazon® EC2 Container Service, may be used to support containers for executing applications with the application streaming service.

The execution environment may specify a description of computing resources, such as compute instances, that are suitable for executing the one or more applications associated with the execution environment. The computing resource description may indicate a recommended type of compute instance, e.g., where the provider network provides multiple types of compute instances that vary in performance and/or cost. The computing resource description may indicate a recommended configuration of a compute instance or other configuration of memory resources, storage resources, network resources, power resources, and other suitable types of computing resources. The computing resource description may specify a range of acceptable resources, such as a range bounded by a minimum instance type and/or configuration and a maximum instance type and/or configuration. Based (at least in part) on the computing resource description for the execution environment, one or more computing resources may be selected and/or configured for execution of the application. The resource(s) may be said to be selected for their compatibility with the computing resource description, e.g., such that the resource(s) meet or match the computing resource description. The computing resource(s) may include one or more physical compute instances, one or more virtual compute instances, one or more storage resources, one or more network resources, and/or other suitable types of computing resources. In one embodiment, the computing resource(s) may be provisioned from a pool of computing resources offered by a provider network. The provider network may represent a multi-tenant environment in which different resources are used by (or on behalf of) different clients at any given time. In one embodiment, based on a prior arrangement with the client, one or more compute instances and/or other resources may be reserved and kept running for the client such that resources need not be newly provisioned and launched when a user associated with that client seeks access to application streaming.

As shown in 650, execution of the application may be initiated using the one or more computing resources selected above. The execution may produce a pixel display or other set of pixel data that may be refreshed at appropriate intervals. The pixel data may represent a user interface of the application, e.g., including one or more windows or other graphical user interface (GUI) elements as would typically be generated by execution of the application on a particular operating system. In this manner, a graphical representation of execution of the application may be rendered in the provider network.

As shown in 660, the pixel data may be streamed to the client computing device. The pixel data may be displayed in a browser or other client software of the client computing device. User input to the application (e.g., by mouse, trackpad, keyboard, touch input, and so on) may be gathered in the browser or client software and transmitted to the application executing in the provider network. In general, the user input may be restricted to controlling operation of the application itself and not to other aspects of the instance on which the application is executed (e.g., other programs running on the instance). In some embodiments, however, the user input may be permitted to modify or select a limited number of configuration options for the instance. In this manner, responsibility for executing the application and rendering its user interface may be delegated from the client computing device to computing resources in the provider network, as specified in an execution environment associated with an access environment, and the client device may merely display the results.

Illustrative Computer System

Figure 7:
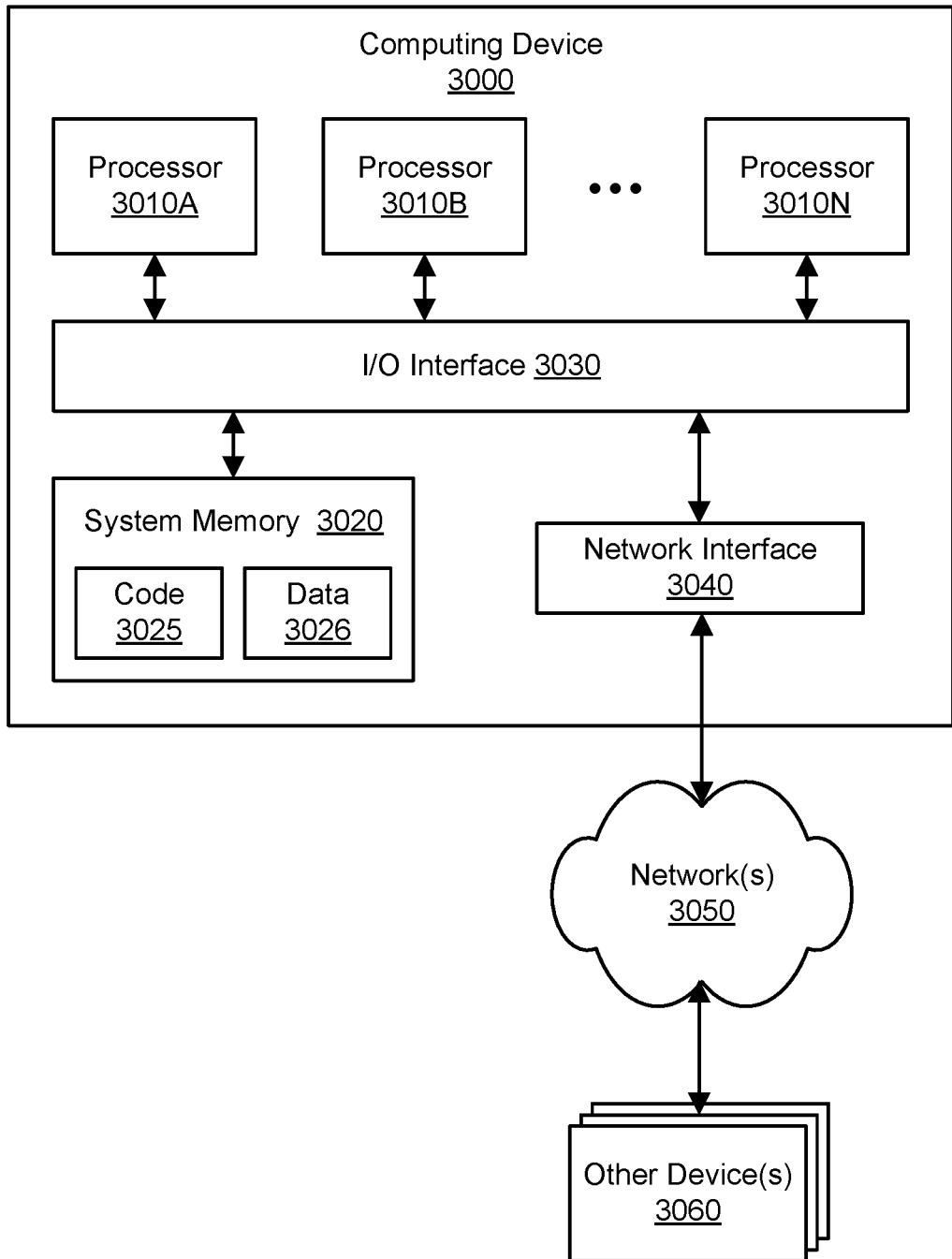
FIG. 7 illustrates an example computing device that may be used in some embodiments.

In at least some embodiments, a computer system that implements a portion or all of one or more of the technologies described herein may include a computer system that includes or is configured to access one or more computer-readable media. FIG. 7 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a plurality of computing resources of a provider network; and
one or more computing devices configured to implement an application streaming service, wherein the application streaming service is configured to:
receive, at an access environment, an indication of an application from a user, wherein the access environment is associated with an execution environment for the application and permits access by the user, and wherein the execution environment specifies a computing resource description;
execute the application using one or more of the computing resources compatible with the computing resource description; and
stream pixel data to a client device based on the execution of the application.

2. The system as recited in claim 1, wherein to receive the indication of the application from the user, the application streaming service is configured to:
receive, at the access environment, a selection of the application from a plurality of applications available for selection by the user, wherein the access environment is associated with execution environments for respective ones of the plurality of applications.

3. The system as recited in claim 1, wherein the application streaming service is further configured to:
receive, at the access environment, another indication of another application from the user, wherein the access environment is associated with another execution environment for the other application, and wherein the other execution environment specifies another computing resource description;
execute the other application using one or more other ones of the computing resources compatible with the other computing resource description, and
stream other pixel data to the client device or another client device based on the execution of the other application using the one or more other computing resources.

4. The system as recited in claim 1, wherein the application streaming service is further configured to:
receive, at another access environment, another indication of the application from another user, wherein the other access environment is associated with the execution environment for the application and permits access by the other user;
execute the application using one or more other ones of the computing resources compatible with the computing resource description, and
stream other pixel data to another client device based on the execution of the application using the one or more other computing resources.

5. The system as recited in claim 1, wherein the execution environment specifies an application source for the application, and wherein the application streaming service is further configured to:
   install the application on the one or more computing resources using the application source.

6. The system as recited in claim 1, wherein an access address associated with the access environment comprises a uniform resource locator (URL), and wherein to receive the indication of the application from the user, the application streaming service is configured to:
   receive, at the access address, the indication of the application from the user.

7. The system as recited in claim 1, wherein the application streaming service is further configured to:
   provision the one or more computing resources from a pool of resources of the provider network.

8. A computer-implemented method, comprising:
   performing, by one or more computing devices that implement an application streaming service:
      receiving, at an access environment, an indication of an application from a user, wherein the access environment is associated with an execution environment for the application and permits access by the user, and wherein the execution environment specifies a computing resource description;
      executing the application using one or more computing resources compatible with the computing resource description; and
      streaming pixel data to a client device based on the execution of the application.

9. The method as recited in claim 8, wherein the receiving the indication of the application from the user comprises:
   receiving, at the access environment, a selection of the application from a plurality of applications available for selection by the user, wherein the access environment is associated with execution environments for respective ones of the plurality of applications.

10. The method as recited in claim 8, further comprising:
    receiving, at the access environment, another indication of another application from the user, wherein the access environment is associated with another execution environment for the other application, and wherein the other execution environment specifies another computing resource description;
    executing the other application using one or more other ones of the computing resources compatible with the other computing resource description, and
    streaming other pixel data to the client device or another client device based on the execution of the other application using the one or more other computing resources.

11. The method as recited in claim 8, further comprising:
    receiving, at another access environment, another indication of the application from another user, wherein the other access environment is associated with the execution environment for the application and permits access by the other user;
    executing the application using one or more other ones of the computing resources compatible with the computing resource description, and
    streaming other pixel data to another client device based on the execution of the application using the one or more other computing resources.

12. The method as recited in claim 8, wherein the execution environment specifies an application source for the application, and wherein the application is installed on the one or more computing resources using the application source.

13. The method as recited in claim 8, wherein the user input is received at an access address associated with the access environment, wherein the access address comprises a uniform resource locator (URL), and wherein the pixel data is streamed to a browser application on the computing device associated with the client.

14. The method as recited in claim 8, wherein, based at least in part on a configuration specified for the execution environment, the application is loaded onto the one or more computing resources prior to receiving the user input comprising the selection of the application.

15. One or more non-transitory computer-accessible storage media storing program instructions that when executed on or across one or more processors cause the one or more processors to:
    receive, at an access environment, an indication of an application from a user, wherein the access environment is associated with an execution environment for the application and permits access by the user, and wherein the execution environment specifies a computing resource description;
    execute the application using one or more computing resources compatible with the computing resource description; and
    stream pixel data to a client device based on the execution of the application.

16. The one or more storage media as recited in claim 15, wherein to receive the indication of the application from the user, the program instructions when executed on or across the one or more processors cause the one or more processors to:
    receive, at the access environment, a selection of the application from a plurality of applications available for selection by the user, wherein the access environment is associated with execution environments for respective ones of the plurality of applications.

17. The one or more storage media as recited in claim 15, further comprising program instructions that when executed on or across the one or more processors further cause the one or more processors to:
    receive, at the access environment, another indication of another application from the user, wherein the access environment is associated with another execution environment for the other application, and wherein the other execution environment specifies another computing resource description;
    execute the other application using one or more other ones of the computing resources compatible with the other computing resource description, and
    stream other pixel data to the client device or another client device based on the execution of the other application using the one or more other computing resources.

18. The one or more storage media as recited in claim 15, further comprising program instructions that when executed on or across the one or more processors further cause the one or more processors to:
    receive, at another access environment, another indication of the application from another user, wherein the other access environment is associated with the execution environment for the application and permits access by the other user;

execute the application using one or more other ones of the computing resources compatible with the computing resource description, and stream other pixel data to another client device based on the execution of the application using the one or more other computing resources.

19. The one or more storage media as recited in claim 15, wherein the execution environment specifies an application source for the application, and further comprising program instructions that when executed on or across the one or more processors further cause the one or more processors to:

install the application on the one or more computing resources using the application source.

20. The one or more storage media as recited in claim 19, wherein the application source comprises a machine image, and further comprising program instructions that when executed on or across the one or more processors further cause the one or more processors to:

boot the one or more computing resources using the machine image.

* * * * *